US009743064B2

(12) United States Patent
Joseph

(10) Patent No.: US 9,743,064 B2
(45) Date of Patent: Aug. 22, 2017

(54) SYSTEM AND METHOD FOR DISTRIBUTING HIGH-QUALITY 3D VIDEO IN A 2D FORMAT

(75) Inventor: Kuriacose Joseph, Gaithersburg, MD (US)

(73) Assignee: The DIRECTV Group, Inc., El Segundo, CA (US)

(*) Notice: Subject to any disclaimer, the term of this patent is extended or adjusted under 35 U.S.C. 154(b) by 1130 days.

(21) Appl. No.: 13/609,708

(22) Filed: Sep. 11, 2012

(65) Prior Publication Data

US 2014/0071231 A1 Mar. 13, 2014

(51) Int. Cl.
*H04N 13/00* (2006.01)
*H04N 19/597* (2014.01)

(52) U.S. Cl.
CPC ..... *H04N 13/0029* (2013.01); *H04N 13/0007* (2013.01); *H04N 13/0048* (2013.01)

(58) Field of Classification Search
CPC ........ H04N 19/00; H04N 21/00; H04N 13/00; H04N 7/00; H04N 19/597
USPC ............................ 348/43; 375/240; 382/260
See application file for complete search history.

(56) References Cited

U.S. PATENT DOCUMENTS

RE44,685 E * 12/2013 Joseph et al. ................. 709/201
2004/0268408 A1* 12/2004 Lee et al. ...................... 725/116
2010/0220792 A1* 9/2010 Kamito et al. ........... 375/240.25
2010/0260268 A1* 10/2010 Cowan et al. ........... 375/240.25
2011/0063298 A1* 3/2011 Hulyalkar et al. ............ 345/427
2011/0255003 A1* 10/2011 Pontual et al. ............... 348/569
2011/0280300 A1* 11/2011 Tourapis et al. ........... 375/240.2
2011/0280316 A1* 11/2011 Chen et al. .............. 375/240.25
2012/0114260 A1* 5/2012 Takahashi et al. ........... 382/238

FOREIGN PATENT DOCUMENTS

EP 2451177 A1 * 5/2012
WO WO 2010011556 A1 * 1/2010
WO WO 2010088420 A1 * 8/2010
WO WO 2011001864 A1 * 1/2011
WO WO 2011005624 A1 * 1/2011
WO WO 2012006299 A1 * 1/2012

OTHER PUBLICATIONS

International Search Report and Written Opinion dated Nov. 4, 2013 in International Application No. PCT/US2013/057393 filed Aug. 29, 2013 by Kuriacose Joseph et al.

* cited by examiner

*Primary Examiner* — Christopher S Kelley
*Assistant Examiner* — Kathleen Walsh
(74) *Attorney, Agent, or Firm* — Fitzgerald & Isaacson, LLP

(57) ABSTRACT

A checkerboard subsampled image is packed in a format to remove shifts that would otherwise result in jagged edges where edges that were not jagged used to exist when checkerboard subsampling is used to reduce video bandwidth. The packing format places alternate rows of a checkerboard subsampled image row by row or places alternate columns of a checkerboard image line by line. By removing the shift and jagged edges, high frequency components that are difficult to compress and that display as annoying artifacts are eliminated.

18 Claims, 9 Drawing Sheets

612

| L11 | L13 | L15 | L17 | R12 | R14 | R16 | R18 |
|---|---|---|---|---|---|---|---|
| L31 | L33 | L35 | L37 | R32 | R34 | R36 | R38 |
| L51 | L53 | L55 | L57 | R52 | R54 | R56 | R58 |
| L71 | L73 | L76 | L77 | R72 | R74 | R76 | R78 |
| L22 | L24 | L26 | L28 | R21 | R23 | R25 | R27 |
| L42 | L44 | L46 | L48 | R41 | R43 | R45 | R47 |
| L62 | L64 | L66 | L68 | R61 | R63 | R65 | R67 |
| L82 | L84 | L84 | L88 | R81 | R83 | R85 | R87 |

614

PACKED LEFT EYE IMAGE 602

PACKED RIGHT EYE IMAGE 604

100
104
106
136
138
LNB
134
144
146
150
152
148
Television
AV Receiver
Audio Source(s)
140
Set Top Box
142
Downlink Module
154
Recorder
User Premises
112
114a
Network Resource
Network Resource
114b
115b
Browser
115a
Browser
Network
110
108
Data Sources
102
133
116
Head End
118
130
128
Converter
Modulator
103
Transport Processing System
124
123
132
131
122
Multiplexer
Compression
Packer
Filter/Subsampler
Decoder

302

Odd Column 308
Even Column 312

| L11 | L12 | L13 | L14 | L15 | L16 | L17 | L18 |
|---|---|---|---|---|---|---|---|
| L21 | L22 | L23 | L24 | L25 | L26 | L27 | L28 |
| L31 | L32 | L33 | L34 | L35 | L36 | L37 | L38 |
| L41 | L42 | L43 | L44 | L45 | L46 | L47 | L48 |
| L51 | L52 | L53 | L54 | L55 | L56 | L57 | L58 |
| L61 | L62 | L63 | L64 | L65 | L66 | L67 | L68 |
| L71 | L72 | L73 | L74 | L75 | L76 | L77 | L78 |
| L81 | L82 | L83 | L84 | L85 | L86 | L87 | L88 |

Left Eye Image 304

Odd Line 316
Even Line 318

Odd Column 310
Even Column 314

| R11 | R12 | R13 | R14 | R15 | R16 | R17 | R18 |
|---|---|---|---|---|---|---|---|
| R21 | R22 | R23 | R24 | R25 | R26 | R27 | R28 |
| R31 | R32 | R33 | R34 | R35 | R36 | R37 | R38 |
| R41 | R42 | R43 | R44 | R45 | R46 | R47 | R48 |
| R51 | R52 | R53 | R54 | R55 | R56 | R57 | R58 |
| R61 | R62 | R63 | R64 | R65 | R66 | R67 | R68 |
| R71 | R72 | R73 | R74 | R75 | R76 | R77 | R78 |
| R81 | R82 | R83 | R84 | R85 | R86 | R87 | R88 |

Right Eye Image 306

| L11 | | L13 | | L15 | | L17 | |
|---|---|---|---|---|---|---|---|
| | L22 | | L24 | | L26 | | L28 |
| L31 | | L33 | | L35 | | L37 | |
| | L42 | | L44 | | L46 | | L48 |
| L51 | | L53 | | L55 | | L57 | |
| | L62 | | L64 | | L66 | | L68 |
| L71 | | L73 | | L75 | | L77 | |
| | L82 | | L84 | | L86 | | L88 |

Subsampled Left Eye Image 402

| | R12 | | R14 | | R16 | | R18 |
|---|---|---|---|---|---|---|---|
| R21 | | R23 | | R25 | | R27 | |
| | R32 | | R34 | | R36 | | R38 |
| R41 | | R43 | | R45 | | R47 | |
| | R52 | | R54 | | R56 | | R58 |
| R61 | | R63 | | R65 | | R67 | |
| | R72 | | R74 | | R76 | | R78 |
| R81 | | R83 | | R85 | | R87 | |

Subsampled Right Eye Image 404

Figure 4

SYSTEM AND METHOD FOR DISTRIBUTING HIGH-QUALITY 3D VIDEO IN A 2D FORMAT

BACKGROUND

Field

Embodiments relate to providing a three dimensional (3D) television experience to viewers. More particularly, embodiments relate to reformatting 3D television data into a two-dimensional (2D) television data format for distribution to viewers.

Background

Now that the 3D viewing experience has migrated from the theater to the home, 3D televisions are becoming increasingly popular. As a result, content providers face increasing demand for 3D content. This, in turn, requires broadcast service providers, such as terrestrial and non-terrestrial providers to develop techniques for distributing 3D content to their subscribers, the ultimate viewers.

Distribution of 3D video requires distribution of stereoscopic 3D images. A stereoscopic 3D image comprises one image for the left eye and one image for the right eye. At the receiving end, the left and right eye images are presented to the viewer's left and right eyes, respectively, to achieve the 3D effect.

If bandwidth were not a problem, the requisite left and right eye images could be sent in their entirety. Such transmission would be lossless. However, for distribution to the home, bandwidth and channel usage conservation are essential considerations. For example, sending independent full resolution stereoscopic left and right eyes images would require using two channels to deliver a single television program. Because of a need to conserve bandwidth, two channel delivery for a single television program is unsatisfactory.

To avoid the requirement that two channels of bandwidth be used to transmit a single 3D program, a 2D frame compatible 3D format was introduced. In a 2D frame compatible 3D format, the left and right eyes images are packed into a single 2D frame. To accomplish this, the left and right eye images are subsampled. The subsampled left and right eye images are then combined to create a 2D image, which can be stored in a conventional 2D format. While this combined image is not a real image in a traditional sense, the combined left and right eye images fit into the 2D frame. The 2D frame containing the subsampled left and right eye images is then distributed for processing and viewing. Such 2D frame compatible 3D is implemented by most major broadcast service providers, including broadcast systems over satellite and cable channels.

The required subsampling can be performed in a number of ways. For example, one subsampling technique involves subsampling the left and right eye images in the horizontal direction. In vertical subsampling, alternate rows of the left eye image and alternate rows of the right eyes images are selected to be combined. The combination involves placing the subsampled images (alternate rows of the left eye image and alternate rows of the right eye image) on top of one another in an over-under configuration to pack the 3D image in a format compatible with a 2D frame. Alternatively subsampled rows of the left and right eye images can be interleaved with one another to pack the 3D image in a format compatible with a 2D frame.

Another subsampling technique involves subsampling the left and right eye images in the vertical direction. In horizontal subsampling, alternate columns of the left eye image and alternate columns of the right eyes images are selected to be combined. The combination involves placing the subsampled images (alternate rows of the left eye image and alternate rows of the right eye image) adjacent to one another in a side-by-side configuration to pack the 3D image in a format compatible with a 2D frame. Alternatively subsampled columns of the left and right eye images can be interleaved with one another to pack the 3D image in a format compatible with a 2D frame.

This resulting 3D image is then compressed and transmitted to a set top box. For example, MEPG-2 or MPEG-4 coding are common compression techniques used. The set top box decompresses the received 2D frame, and transmits the decompressed 2D frame to a television. The television separates the packed left eye image and right eye image, and then creates independent left eye and right eye images in full screen resolution for display as a 3D image.

Another form of subsampling is known as checkerboard subsampling. Checkerboard subsampling involves selecting alternate pixels in row and columns of the left eye and right eye images. Theoretically, checkerboard subsampling provides optimal performance in the absence of compression. This is because with either vertical or horizontal subsampling, resolution in the direction of the skipped rows or columns is halved as filters are only applied in the direction of the subsampling to account for skipping rows (vertical subsampling) or skipping columns (horizontal subsampling).

With checkerboard subsampling, however, a 2D filter can be applied. As a result, the horizontal and vertical bandwidth of the video image can be increased. Although checkerboard subsampling results in a reduction in resolution in the diagonal direction, this is generally less noticeable. As a result, checkerboard subsampling better preserves horizontal and vertical frequencies.

One type of 2D filter used in checkerboard subsampling is a quincunx filter. In general, a quincunx filter passes higher frequencies in the horizontal and vertical directions, but lower frequencies in the diagonal direction. Checkerboard subsampling with quincunx filtering is considered optimal for preserving image quality, thereby providing a better video experience.

However, there is a significant problem with conventional checkerboard subsampling when the subsampled 3D data is packed into a 2D format for transmission as a 2D image, whether the data is packed in an over-under configuration or side-by-side configuration. The problem is that conventional packing formats for checkerboard data do not compress well. The problem manifests itself in that when conventional compression algorithms are applied to the packed checkerboard data, the resulting data exhibits numerous annoying artifacts. These artifacts result from the shift between the rows and columns of the checkerboard subsampled data. That is, during packing alternate lines, or alternate columns, having samples that are shifted with respect to one another by virtue of the checkerboard subsampling are placed next to one another, but without any shifts. Edges in an underlying image when processed in this manner become jagged. The jagged edges create associated high frequency image components that cause annoying artifacts when the image is compressed. As a result of this problem with checkerboard subsampling, even though it performs better than horizontal or vertical subsampling in the absence of compression, because the reality is that video is generally compressed for transmission and checkerboard subsampling performs suboptimally in the presence of such subsampling, checkerboard subsampling is not used for distributing 3D content to service provider subscribers. Thus, while checkerboard subsampling offers promise of a better 3D viewing experience, it is not used due to the annoying artifacts that are created using conventional packing paradigms to pack 3D data into 2D compatible formats in systems where there is significant compression.

SUMMARY

In an embodiment, three dimensional (3D) video content is distributed to subscribers using a two dimensional (2D) compatible frame format. In an embodiment, the 3D video content is transmitted in the form of stereoscopic 3D images. To improve the 3D viewing experience, in an embodiment, checkerboard subsampling is used. In an embodiment, to avoid annoying artifacts that arise when checkerboard subsampled data is compressed, the checkerboard subsampled image is packed in a format to remove shifts that would otherwise result in jagged edges when checkerboard subsampling is used to reduce video bandwidth. In an embodiment, the packing format places alternate rows of a checkerboard subsampled image row by row or places alternate columns of a checkerboard image line by line. By removing the shift and jagged edges, high frequency components that display as annoying artifacts are eliminated.

In an embodiment, a system provides 3D content to a viewer. The system includes a subsampler to subsample a stereoscopic 3D image, a packer to pack the subsampled stereoscopic 3D image into a 2D compatible format such that data shifts resulting from the subsampling are removed, a compression system to compress the packed data, and a transmitter to transmit the packed data to the viewer. In an embodiment, the subsampling is checkerboard subsampling. In an embodiment, the packing avoids jagged edges that would reduce compression effectiveness.

In another embodiment, method for providing 3D content to a viewer includes subsampling a stereoscopic 3D image, packing the subsampled 3D image into a 2D compatible format such that data shifts resulting from the subsampling are removed, compressing the packed data, and transmitting the packed content to the viewer.

In another embodiment, a system to present 3D content to a viewer, includes a set top box to receive a stereoscopic 3D image in a 2D compatible format such that data shifts resulting from subsampling of the stereoscopic 3D image are removed and a presentation system to display the decompressed 3D content to a viewer.

In another embodiment, a method for presenting 3D content to a viewer includes receiving a stereoscopic 3D image in a 2D compatible format such that data shifts resulting from subsampling of the stereoscopic 3D image are removed, decompressing the received stereoscopic 3D image, and presenting the decompressed stereoscopic 3D image to a viewer.

BRIEF DESCRIPTION OF THE DRAWINGS

FIG. 3 illustrates a full resolution stereoscopic image according to an embodiment.

FIG. 4 illustrates a checkerboard subsampled image that results from checkerboard subsampling exemplary image according to an embodiment.

DETAILED DESCRIPTION

Figure 1:
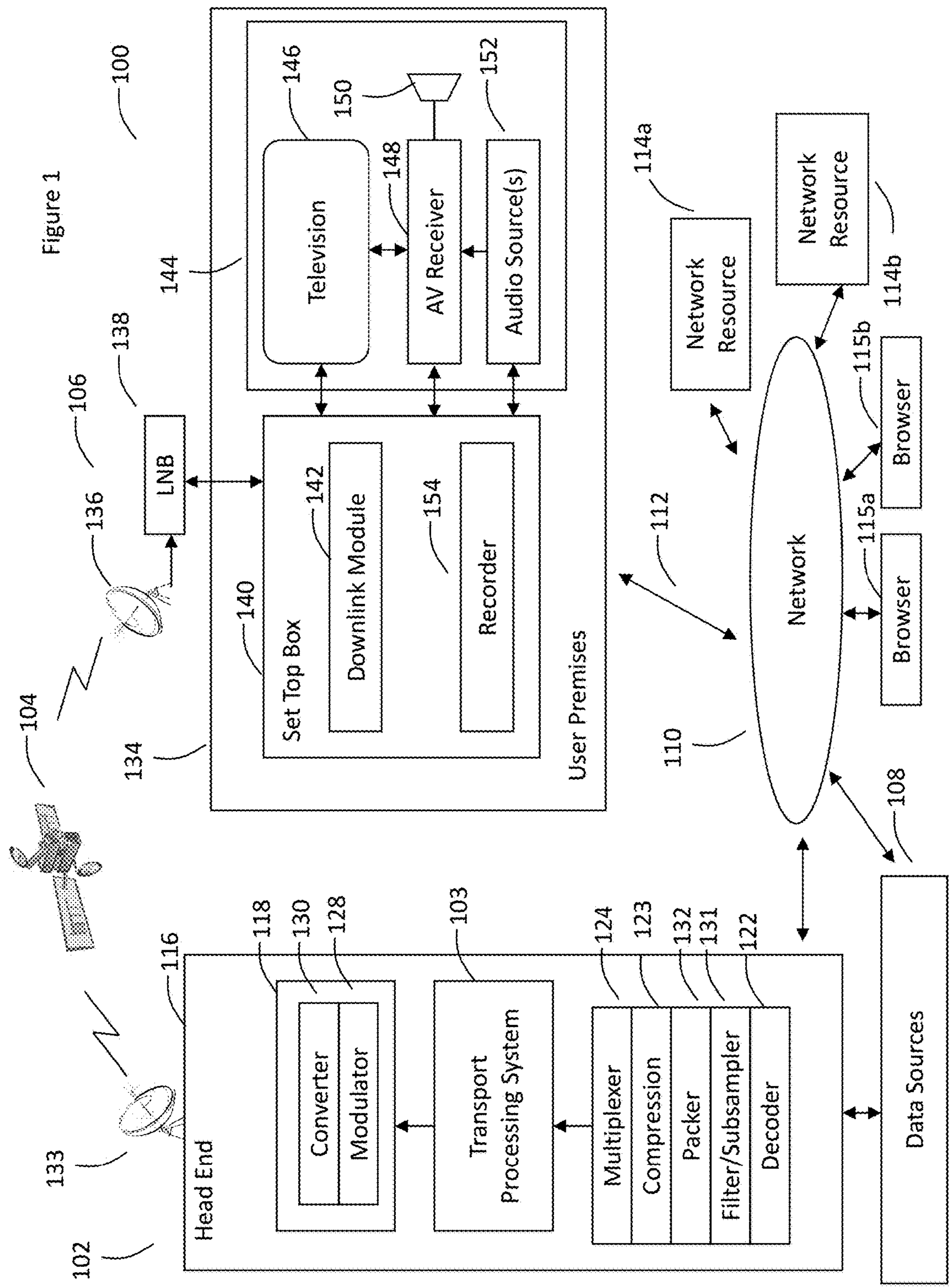
FIG. 1 is a schematic diagram of an exemplary system for providing television services in a television broadcast system, such as a television satellite service provider, according to an embodiment.

FIG. 1 is a schematic diagram of an exemplary system 100 for providing television services in a television broadcast system, such as a television satellite service provider, according to an embodiment. As shown in FIG. 1, exemplary system 100 is an example direct-to-home (DTH) transmission and reception system 100. The example DTH system 100 of FIG. 1 generally includes a transmission station 102, a satellite/relay 104, and a plurality of receiver stations, one of which is shown at reference numeral 106, between which wireless communications are exchanged at any suitable frequency (e.g., Ku-band, Ka-band, and reverse band frequencies). As described in detail below with respect to each portion of the system 100, information from one or more of a plurality of data sources 108 is transmitted from transmission station 102 to satellite/relay 104. Satellite/relay 104 may be at least one geosynchronous or geo-stationary satellite. In turn, satellite/relay 104 rebroadcasts the information received from transmission station 102 over broad geographical area(s) including receiver station 106. Exemplary receiver station 106 is also communicatively coupled to transmission station 102 via a network 110. Network 110 can be, for example, the Internet, a local area network (LAN), a wide area network (WAN), a conventional public switched telephone network (PSTN), and/or any other suitable network system. A connection 112 (e.g., a terrestrial link via a telephone line and cable) to network 110 may also be used for supplemental communications (e.g., software updates, subscription information, programming data, information associated with interactive programming, etc.) with transmission station 102 and/or may facilitate other general data transfers between receiver station 106 one or more network resources 114*a* and 114*b*, such as, for example, file servers, web servers, and/or databases (e.g., a library of on-demand programming).

Data sources 108 receive and/or generate video, audio, and/or audiovisual programming including, for example, television programming, movies, sporting events, news, music, pay-per-view programs, advertisement(s), game(s), etc. In the illustrated example, data sources 108 receive programming from, for example, television broadcasting networks, cable networks, advertisers, and/or other content distributors. Further, example data sources 108 may include a source of program guide data that is used to display an interactive program guide (e.g., a grid guide that informs users of particular programs available on particular channels at particular times and information associated therewith) to an audience. Users can manipulate the program guide (e.g., via a remote control) to, for example, select a highlighted program for viewing and/or to activate an interactive feature (e.g., a program information screen, a recording process, a future showing list, etc.) associated with an entry of the program guide. Further, example data sources 108 include a source of on-demand programming to facilitate an on-demand service.

An example head-end 116 includes a decoder 122, a filter/subsampler 131, a packer 132 a compression system 123, a transport processing system (TPS) 103 and an uplink module 118. In an embodiment, decoder 122 decodes the information by for example, converting the information into data streams. In an embodiment, filter/subsampler 131 provides filtering and subsampling as described herein. In an embodiment, the data is received in a subsampled format, and filter/subsampler 131 is not applied. In an embodiment, packer 132 packs 3D data into a 2D compatible format. In an embodiment, compression system 123 compresses the bit streams into a format for transmission, for example, MPEG-2 or MPEG-4. In some cases, AC-3 audio is not decoded, but passed directly through without first decoding. In such cases, only the video portion of the source data is decoded.

In an embodiment, multiplexer 124 multiplexes the data streams generated by compression system 123 into a transport stream so that, for example, different channels are multiplexed into one transport. Further, in some cases a header is attached to each data packet within the packetized data stream to facilitate identification of the contents of the data packet. In other cases, the data may be received already transport packetized.

TPS 103 receives the multiplexed data from multiplexer 124 and prepares the same for submission to uplink module 118. In an embodiment, TPS 103 can perform additional processing such as audio processing.

In the illustrated example, the data packet(s) are encrypted using any suitable technique capable of protecting the data packet(s) from unauthorized entities.

Uplink module 118 prepares the data for transmission to satellite/relay 104. In an embodiment, uplink module 118 includes a modulator 128 and a converter 130. During operation, encrypted data packet(s) are conveyed to modulator 128, which modulates a carrier wave with the encoded information. The modulated carrier wave is conveyed to converter 130, which, in the illustrated example, is an uplink frequency converter that converts the modulated, encoded bit stream to a frequency band suitable for reception by satellite/relay 104. The modulated, encoded bit stream is then routed from uplink frequency converter 130 to an uplink antenna 133 where it is conveyed to satellite/relay 104.

Satellite/relay 104 receives the modulated, encoded bit stream from the transmission station 102 and broadcasts it downward toward an area on earth including receiver station 106. Example receiver station 106 is located at a subscriber premises 134 having a reception antenna 136 installed thereon that is coupled to a low-noise-block downconverter (LNB) 138. LNB 138 amplifies and, in some embodiments, downconverts the received bitstream. In the illustrated example of FIG. 1, LNB 138 is coupled to a set-top box 140. While the example of FIG. 1 includes a set-top box, the example methods, apparatus, systems, and/or articles of manufacture described herein can be implemented on and/or in conjunction with other devices such as, for example, a personal computer having a receiver card installed therein to enable the personal computer to receive the media signals described herein, and/or any other suitable device. Additionally, the set-top box functionality can be built into an A/V receiver or a television 146.

Example set-top box 140 receives the signals originating at head-end 116 and includes a downlink module 142 to process the bitstream included in the received signals. Example downlink module 142 demodulates, decrypts, demultiplexes, decodes, and/or otherwise processes the bitstream such that the content (e.g., audiovisual content) represented by the bitstream can be presented on a display device of, for example, a media presentation system 144. Example media presentation system 144 includes a television 146, an AV receiver 148 coupled to a sound system 150, and one or more audio sources 152. As shown in FIG. 1, set-top box 140 may route signals directly to television 146 and/or via AV receiver 148. In an embodiment, AV receiver 148 is capable of controlling sound system 150, which can be used in conjunction with, or in lieu of, the audio components of television 146. In an embodiment, set-top box 140 is responsive to user inputs, for example, to tune a particular channel of the received data stream, thereby displaying the particular channel on television 146 and/or playing an audio stream of the particular channel (e.g., a channel dedicated to a particular genre of music) using the sound system 150 and/or the audio components of television 146. In an embodiment, audio source(s) 152 include additional or alternative sources of audio information such as, for example, an MP3 player (e.g., an Apple® iPod®), a Blu-eray® player, a Digital Versatile Disc (DVD) player, a compact disc (CD) player, a personal computer, etc.

Further, in an embodiment, example set-top box 140 includes a recorder 154. In an embodiment, recorder 154 is capable of recording information on a storage device such as, for example, analog media (e.g., video tape), computer readable digital media (e.g., a hard disk drive, a digital versatile disc (DVD), a compact disc (CD), flash memory, etc.), and/or any other suitable storage device.

Figure 2:
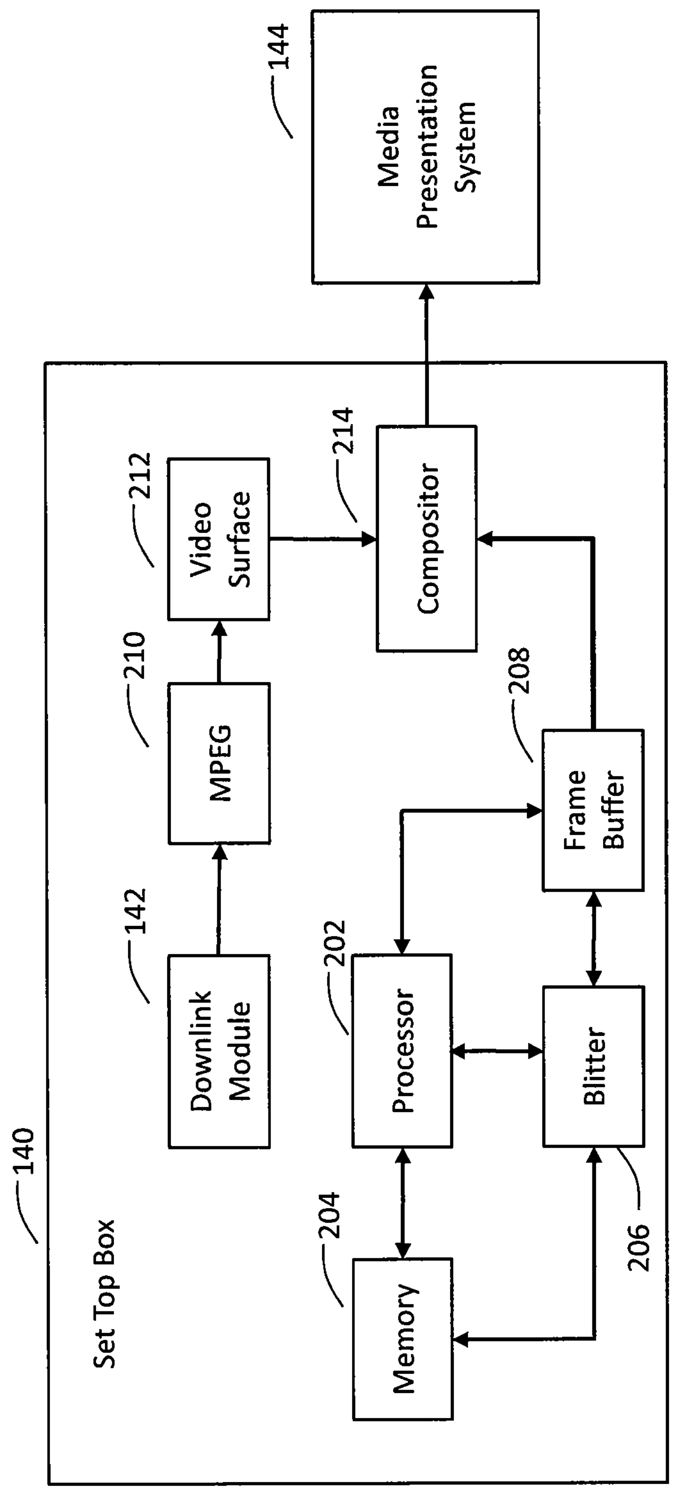
FIG. 2 is a simplified schematic diagram of an exemplary set top box according to an embodiment.

FIG. 2 is a simplified schematic diagram of an exemplary set top box (STB) 140 according to an embodiment. Such a set top box can be, for example, in the Directv HR2x family of set top boxes. As shown in FIG. 2, STB 140 includes a downlink module 142 described above. In an embodiment, downlink module 142 is coupled to an MPEG decoder 210 that decodes the received video stream and stores it in a video surface 212.

A processor 202 controls operation of STB 140. Processor 202 can be any processor that can be configured to perform the operations described herein for processor 202. Processor 202 has accessible to it a memory 204. Memory 204 can be used as storage space for recorder 154 (described above). Further, memory 204 can be used to store programs to be run by processor 202 as well as used by processor 202 for other functions necessary for the operation of STB140 as well as the functions described herein. In alternate embodiments, one or more additional memories may be implemented in STB 140 to perform one or more of the foregoing memory functions.

A blitter 206 performs block image transfer (BLIT or blit) operations. For example, in an embodiment, blitter 206 renders text over a graphics image stored frame buffer 208. In an embodiment, blitter 206 is a co-processor that provides hardware accelerated block data transfers. Blitter 206 renders characters using reduced memory resources and does not require direct access to the frame buffer. A suitable blitter for use in embodiments is the blitter found in the Directv HR2x family of STBs.

Frame buffer 208 stores an image or partial image to be displayed on media presentation system 144. In an embodiment, frame buffer 208 is a part of memory 204. In an embodiment, frame buffer 208 is a 1920×1080×4 bytes buffer that represents every pixel on a high definition video screen with 4 bytes of color for each pixel. In an embodiment, the four colors are red, blue, green, and alpha. In an embodiment, the value in the alpha component (or channel), can range from 0 (fully transparent) to 255 (fully opaque).

A compositor 214 receives data stored in frame buffer 208 and video surface 212. In an embodiment, compositor 214 blends the data it receives from frame buffer 208 with the data it receives from video surface 212 and forwards the blended video stream to media presentation 144 for presentation.

When a data source (e.g., a content provider) 108 provides 3D content to a broadcast service provider, for example a non-terrestrial or terrestrial broadcast provider, it generally does so in full resolution. As described above, to conserve channel bandwidth, broadcast service providers reduce the resolution of the 3D data by some technique of subsampling. When checkerboard subsampling is used, a Quincunx filter can be applied prior to subsampling. Although theoretically optimal for the 3D viewing experience, checkerboard subsampling is not used due to annoying artifacts that are introduced by compressing the data for transmission to the viewer.

To better understand the problem, FIG. 3 illustrates a full resolution stereoscopic image 302 according to an embodiment. As used herein, the term image includes images that comprise a video stream or other video content. Exemplary stereoscopic image 302 comprises a left eye image 304 and a right eye image 306. Left eye image 304 and right eye image 306 each comprise pixels. For example, as shown in FIG. 3, left eye image 304 includes pixels L11 . . . L88, and right eye image includes pixels R11 . . . R88. In the example, the "L" indicates a pixel in left eye image 304, and the "R" indicates a pixel in right eye image 306. The number pair following the "L" and "R" indicates the row (first number) and column (second number) of the pixel, respectively. For example, pixel L34, is the pixel in the third row, fourth column of left eye image 304.

Left eye image 304 and right eye image 306 are shown as containing only 64 pixels for ease of explanation herein. However, in practice any number of pixels for a particular application can be used. For example, common 3D image resolution includes standard definition (NTSC) and high definition (HD) resolution, including 1080i, 1080p, and 720p.

Left eye image 304 and right eye image 306 can also be viewed as having odd and even columns. Odd columns are those columns with an odd number in the column position of the number pair following the "L" and the "R". An exemplary odd column, corresponding to column 1 in left eye image 304, is odd column 308. An exemplary odd column, corresponding to column 1 in right eye image 306, is odd column 310.

Even columns are those columns with an even number in the column position of the number pair following the "L" and the "R". An exemplary even column, corresponding to column 2 in left eye image 304, is even column 312. An exemplary even column, corresponding to column 2 in right eye image 306, is even column 314. It should be pointed out that even and odd are relative terms for explanatory purposes of tracking alternating rows and columns and are not intended to be limiting.

Left eye image 304 and right eye image 306 can also be viewed as having odd and even lines (or rows). Odd lines are those lines with an odd number in the line position of the number pair following the "L" and the "R". An exemplary odd line, corresponding to line 1 in left eye image 304 and right eye image 306, is odd line 316.

Even lines are those lines with an even number in the line position of the number pair following the "L" and the "R". An exemplary even line, corresponding to line 2 in left eye image 304 and right eye image 306 is even line 318.

FIG. 4 illustrates a checkerboard subsampled image 401 that results from checkerboard subsampling exemplary image 302 according to an embodiment. Checkerboard subsampled image 401 comprises a checkerboard subsampled left eye image 402 and a checkerboard subsampled right eye image 404. As can be seen, checkerboard subsampled image 402 is generated starting with pixel L11 in left eye image 304 and selecting to keep alternating pixels in alternating rows (or columns). Similarly, checkerboard subsampled image 404 is generated starting with pixel R12 in right eye image 406 and selecting to keep alternating pixels in alternating rows (or columns).

Although subsampling for subsampled left eye image 402 is shown as starting with pixel L11 in left eye image 304, subsampling could have started with pixel L12 of left eye image 304. Although subsampling for subsampled right eye image 404 is shown as starting with pixel R12 in right eye image 306, subsampling could have started with pixel R11 in right eye image 306. Further, the starting pixel can be in the same location in both left eye and right eye images. Other checkerboard subsampling techniques can be used as appropriate.

After subsampled left eye image 402 and subsampled right eye image 404 are generated they are packed into a 2D frame for distribution, for example, for distribution to subscribers.

Figures 5A, 5B:
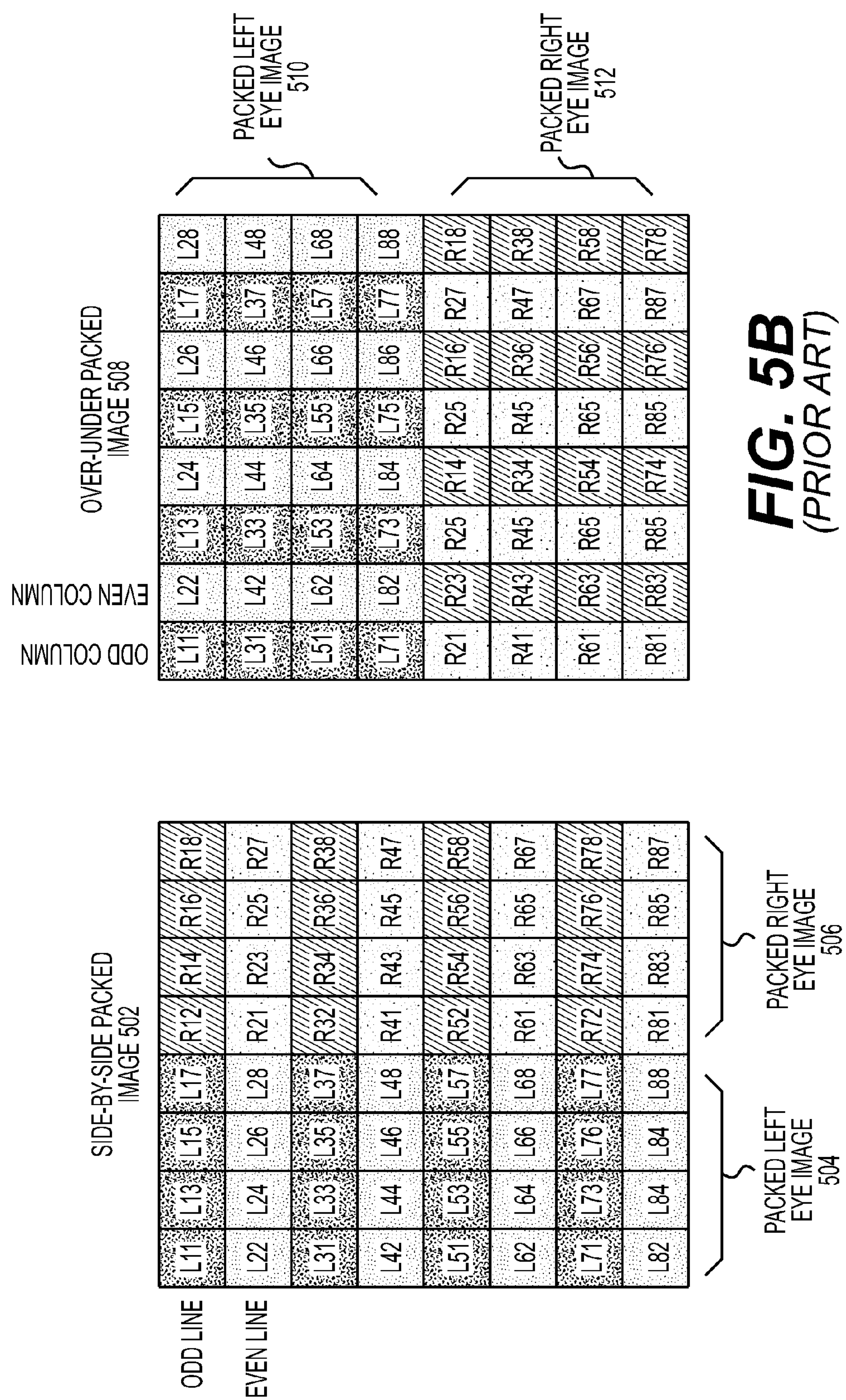
FIG. 5A illustrates a conventional side-by-side packing of pixels from subsampled left eye image and subsampled right eye image to form side-by-side packed image.
FIG. 5B illustrates a conventional over-under packing of pixels from subsampled left eye image and subsampled right eye image to form over-under packed image.

FIG. 5A illustrates a conventional side-by-side packing of pixels from subsampled left eye image 402 and subsampled right eye image 404 to form side-by-side packed image 502. Side-by-side packed image 502 comprises packed left eye image 504 and packed right eye image 506. Side-by-side packed image 502 is essentially the odd and even lines of checkerboard sampled image 401 illustrated in FIG. 4 collapsed and laid on top of one another as illustrated in FIG. 5A. In this manner, side-by-side packed image 502 comprises a 3D image in a 2D frame.

FIG. 5B illustrates a conventional over-under packing of pixels from subsampled left eye image 402 and subsampled right eye image 406 to form over-under packed image 508. Over-under is sometimes referred to as top-and-bottom. Over-under packed image 508 comprises packed left eye image 510 and packed right eye image 512. Over-under packed image 508 is essentially the odd and even columns of checkerboard sampled image 401 illustrated in FIG. 4 collapsed and placed next to one another as shown in FIG. 5B. In this manner, over-under packed image 508 comprises a 3D image in a 2D frame.

The problem lies in collapsing the rows (as in FIG. 5A) or columns (as in FIG. 5B) as in both cases, the rows (or columns) that would otherwise have been shifted with respect to one another lose that shift. As a result, jagged edges with high frequency components are created between the pixels where edges that were not jagged used to exist in the original image. Those frequencies are not handled well with conventional compression techniques, and therefore result in annoying artifacts.

For example, common compression technology used include MPEG-2, MPEG-4, and MPEG-4, Part 10 (AAVC, H.264). These compression techniques include algorithms where discrete cosine transforms (DCT) of blocks of video are processed to convert the data to the frequency domain. The issue with the packed data shown described above is that since pixels are either shifted horizontally with respect to each other on alternate lines, or vertically with respect to each other on alternate columns, edges in objects could either be shifted from line to line or from column to column depending on their orientation. This creates high frequency components in the DCTs that do not compress easily. When compressed in high bit-rate systems the loss in compression efficiency may not significantly degrade video quality, but at lower bit rates corresponding to those used for distribution of video to the home, this could have a negative effect on image quality.

To overcome this deficiency, in embodiments, pixels of checkerboard subsampled image 401 are packed in a different way. Packing the pixels according to embodiments removes the shifts and resulting jagged edges. According to one embodiment, packing is accomplished by placing data from alternating lines in checkerboard subsampled image 401 row by row. In another embodiment, the packing is accomplished by placing data from alternating columns in checkerboard subsampled image 401 column by column. In an embodiment, the packing is performed by packer 132.

Figures 6A, 6B:
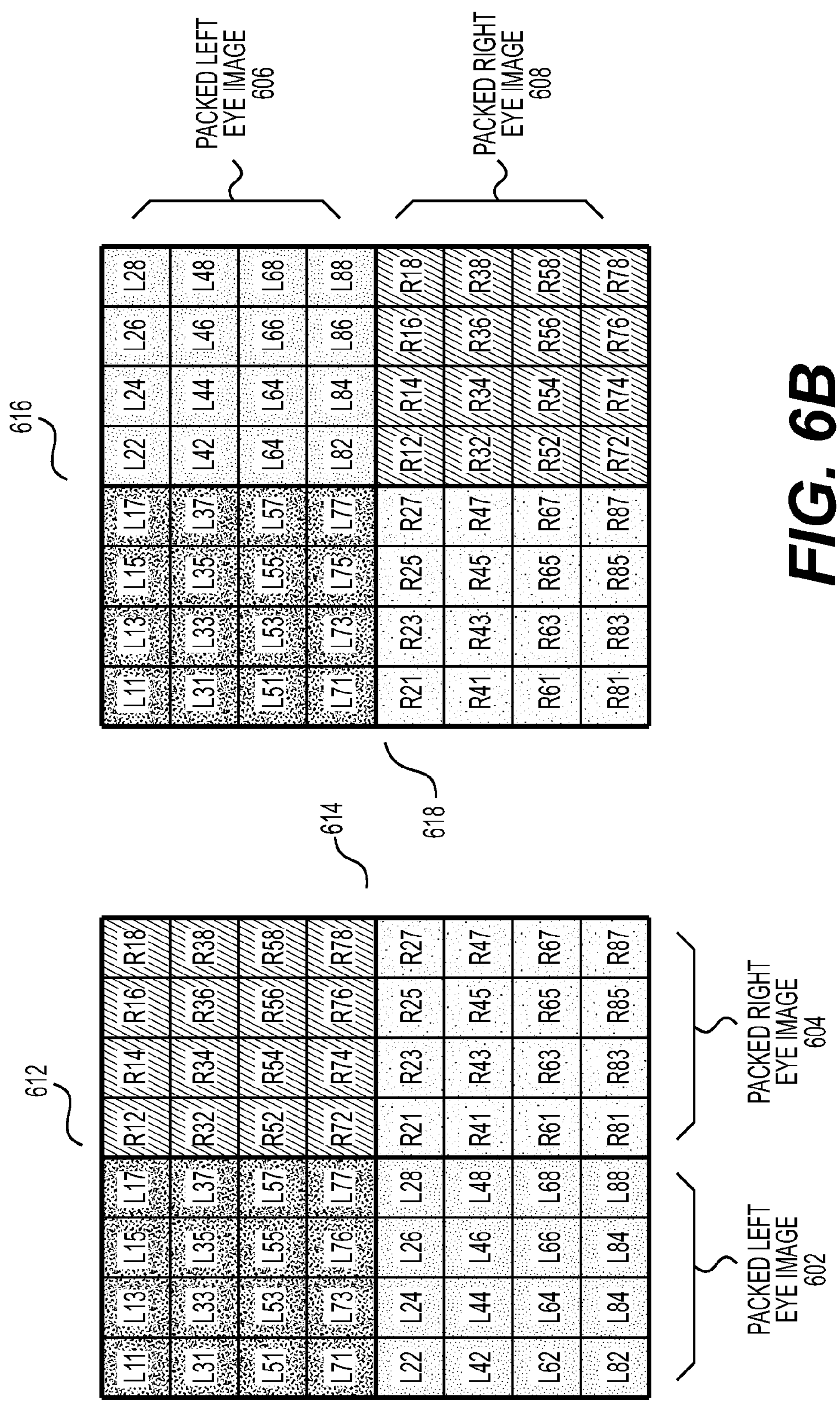
FIG. 6A illustrates an exemplary format for packing a 3D checkerboard subsampled image in a 2D compatible image frame according to an embodiment.
FIG. 6B illustrates another exemplary format for packing a 3D checkerboard subsampled image in a 2D compatible image frame according to an embodiment.

FIG. 6A illustrates an exemplary format for packing a 3D checkerboard subsampled image in a 2D compatible image frame according to an embodiment. In the example illustrated in FIG. 6A, pixels from alternating lines of checkerboard subsampled image 401 are placed row by row. Pixels from subsampled left eye image 402 are placed row by row to form packed left eye image 602 and pixels from subsampled right eye image 406 are placed row by row to form packed right eye image 604.

FIG. 6B illustrates another exemplary format for packing a 3D checkerboard subsampled image in a 2D compatible image frame according to an embodiment. In the example illustrated in FIG. 6B, pixels from alternating columns of checkerboard subsampled image 401 are placed column by column. Pixels from subsampled left eye image 404 are placed column by column to form packed left eye image 606 and pixels from subsampled right eye image 406 are placed row by row column by column to form packed right eye image 604.

Packing the pixels to remove the shifts from row to row or column to column that would otherwise be present removes the jagged edges and corresponding high frequency components that cause conventional compression algorithms not to work well. As a result, packing the pixels as described yields improved compression characteristics that can allow distribution of checkerboard subsampled 3D images in a 2D compatible frame. As a result, viewers can achieve a better 3D viewing experience as broadcast service providers will be able to deliver video programming having the benefits associated with checkerboard subsampling.

High frequency components may be present across the boundaries of the quadrants shown in the pixel packing illustrated in FIGS. 6A and 6B. In FIG. 6A the boundaries are illustrated as vertical boundary 612 and horizontal boundary 614. In FIG. 6B the boundaries are illustrated as vertical boundary 616 and horizontal boundary 618.

Figure 6C:
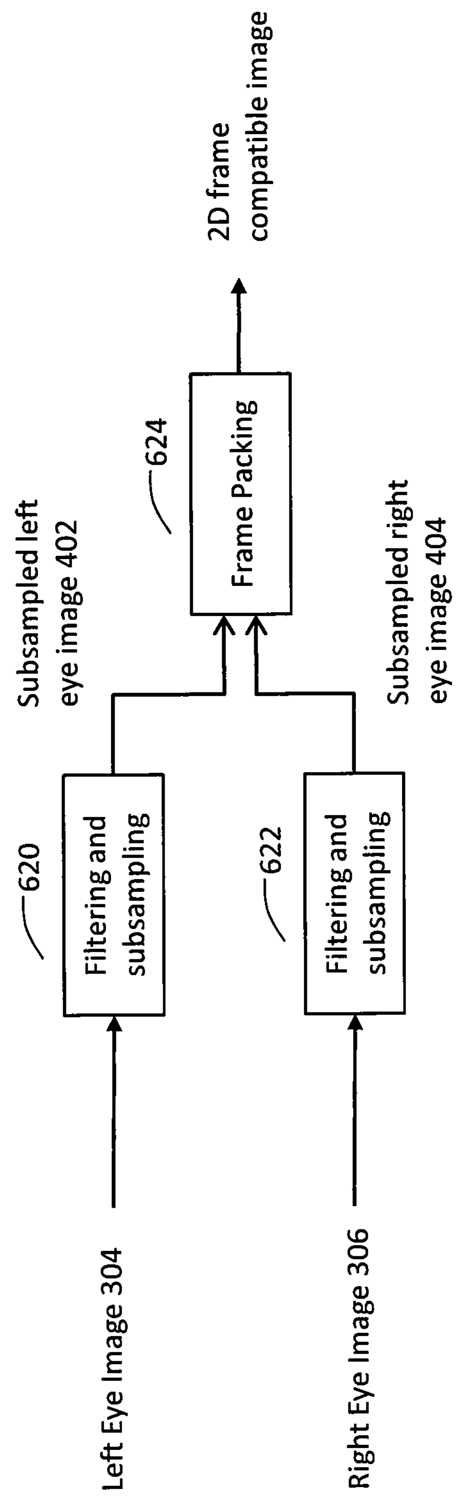
FIG. 6C is a schematic showing processing of left eye image and right eye image to generate a 3D image packed in 2D compatible frame for transmission to subscribers.

FIG. 6C is a schematic showing processing of left eye image 304 and right eye image 306 to generate a 3D image packed in 2D compatible frame for transmission to subscribers. As shown in FIG. 6C, left eye image 304 is input to filtering and subsampling block 620, and right eye image 306 is input to filtering and subsampling block 622. In an embodiment, the filtering is Quincunx filtering and the subsampling is checkerboard subsampling. The outputs of block 620 and 622 are subsampled left eye image 402 and subsampled right eye image 406 respectively. The outputs of blocks 620 and 622 are input to frame packing block 624. Frame packing block 624 outputs the packed 3D left and right eye images in a 2D compatible image, for example, the image illustrated in FIG. 6A or FIG. 6B.

In an embodiment, the potential high frequency noise contribution of the quadrant boundaries is addressed by placing intelligence in the encoder in compression system 123 that performs the compression to treat these boundaries differently. For example, the encoder may provide for finer quantization (higher resolution) at the boundaries to preserve higher frequency data likely to be encountered when the compression algorithms cross boundaries. Although this may reduce the compression efficiency somewhat, it does not reduce it significantly.

After the image is compressed it is further processed for transmission to a viewer. When the compressed image is received by the viewer's customer premises equipment, the received compressed image is decompressed, unpacked, and reconstituted to provide the left and right eye images to the viewer. In an embodiment, for example, STB 140 decompresses the received compressed image and forwards the decompressed image data to a television. The television unpacks the decompressed image data to recover the checkerboard subsampled left eye and right eye images that were originally sent. Using the recovered left eye and right eye images, the television reconstitutes the left eye and right eye images to be presented to the viewer to provide the 3D viewing experience. In another embodiment, STB 140 reconstitutes the left and right images and sends full resolution 3D left and right eye images to the viewer's television.

Generally, when STB 140 decompresses the received compressed image, the result is in a 3D compatible format, for example, side-by-side or over-under format, and the viewer's television is responsible for reconstituting the image provided by STB 140 in the 3D format. As a result, in an embodiment where the decompressed image data is not in a standard 3D compatible format that the television recognizes, STB 140 will convert the decompressed data into a 3D compatible format that the television recognizes. In another embodiment, STB 140 simply provides the decompressed image data to the viewer's television, which uses the decompressed image data to present a 3D experience to the viewer. In another embodiment, as described above, STB 140 reconstitutes the 3D image and sends the full resolution 3D image to the viewer's television. Other embodiments are also possible depending upon the input and output formats of a particular set top box and viewer television.

In another embodiment, STB 140 repacks the received checkerboard subsampled data into either vertically subsampled data packing or a horizontally subsampled data packing. In this manner, a television that is not checkerboard subsampling compatible can use the data to present a 3D experience to the viewer.

Figure 7:
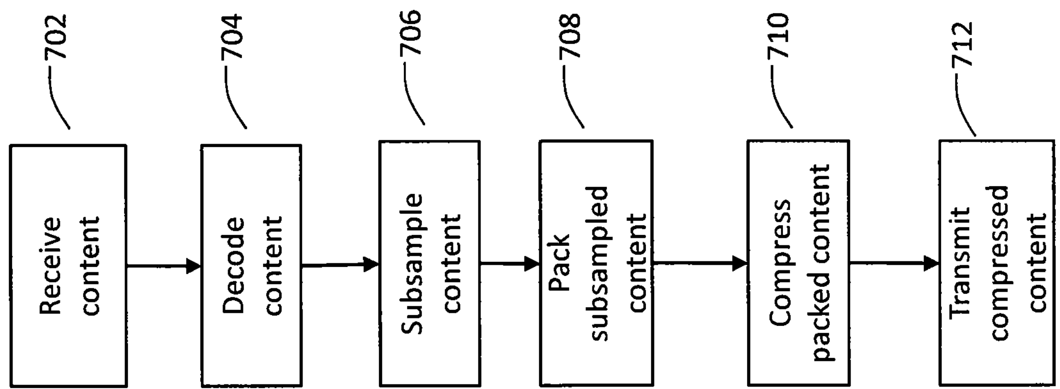
FIG. 7 is a flow chart for processing content received from a data source for transmission to a subscriber.

FIG. 7 is a flow chart for processing content received from a data source 108, such as a content provider, for transmission to a subscriber. In step 702, content (for example, 3D video in the form of stereoscopic 3D images) is received from data source 108. In step 704, the received content is decoded, for example in decoder 122. To reduce the bandwidth for distribution to subscribers, the received content is filtered in step 705 and subsampled in step 706, for example in filter/subsampler 131. For example, in an embodiment, the subsampling technique is checkerboard subsampling. In step 708, the filtered and subsampled content is packed. As described above, in an embodiment, the packing can takes in packer 132. In embodiment, the data is packed according to a format that can store 3D data in a 2D compatible frame so as to remove the shifts from row to row or column to column that would otherwise be present removes the jagged edges and corresponding high frequency components that cause conventional compression algorithms not to work well. In step 710, the packed date is compressed, for example by compression system 123. In step 712, the compressed data is transmitted to a viewer.

Figure 8:
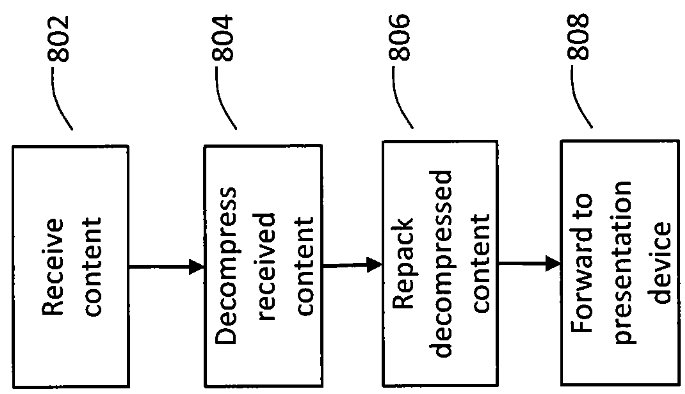
FIG. 8 is a flow chart for receiving and displaying content distributed by a broadcast service provider.

FIG. 8 is a flow chart for receiving and displaying content distributed by a broadcast service provider. In step 802, content, for example 3D video in the form of stereoscopic 3D images is received from a broadcast provider, for example by STB 140. In step 804, the content is decompressed to retrieve the originally transmitted content. In step 806, the decompressed content is repacked in a format a presentation device can process. Step 806 is optional. In step 808, the decompressed (and repacked if step 806 is present) data is forwarded to a presentation device, for example, a television to present to a user.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system to provide 3D content to a viewer, comprising:

a subsampler to subsample a stereoscopic 3D image;

a packer to pack the subsampled stereoscopic 3D image into a 2D compatible format having four quadrants;

a compression system to compress the packed data, wherein the compression system increases processing resolution at at least one quadrant boundary in the packed data; and a transmitter to transmit the packed data to the viewer.

2. The system recited in claim 1, wherein the subsampler performs a checkerboard subsampling.

3. The system recited in claim 1, wherein the packer packs the data in a packing format that removes jagged edges that would otherwise cause artifacts when the data is compressed.

4. The system recited in claim 2, wherein the checkerboard subsampling results in a left eye subsampled image and a right eye subsampled image, and wherein the packer packs the data in a format such that alternate rows of the left eye subsampled image are placed row by row in the left eye image portion of the 2D compatible format, and alternate rows of the right eye subsampled image are placed row by row in the right eye image portion of the 2D compatible format.

5. The system recited in claim 2, wherein the checkerboard subsampling results in a left eye subsampled image and a right eye subsampled image, and wherein the packer packs the data in a format such that alternate columns of the left eye subsampled image are placed column by column in the left eye portion of the 2D compatible image, and alternate columns of the right eye subsampled image are placed column by column in the right eye portion of the 2D compatible image.

6. The system recited in claim 1, further comprising an encoder that performs higher resolution processing on the data at boundaries in the packed data to reduce undesirable noise in the compressed data.

7. A method for providing 3D content to a viewer, comprising:

subsampling a stereoscopic 3D image;

packing the subsampled 3D image into a 2D compatible format that has four quadrants;

compressing the packed data using increased processing resolution at at least one quadrant boundary in the packed data; and transmitting the packed content to the viewer.

8. The method recited in claim 7, wherein the subsampling comprises checkerboard subsampling.

9. The method recited in claim 7, further comprising packing the data in a packing format that remove jagged edges that would otherwise cause artifacts when the data is compressed.

10. The method recited in claim 8, wherein the checkerboard subsampling results in a left eye subsampled image and a right eye subsampled image, and wherein the packing comprises packing the data in a format such that alternate rows of the left eye subsampled image are placed row by row in the left eye image portion of the 2D compatible format, and alternate rows of the right eye subsampled image are placed row by row in the right eye image portion of the 2D compatible format.

11. The method recited in claim 8, wherein the checkerboard subsampling results in a left eye subsampled image and a right eye subsampled image, and wherein the packing packs the data in a format such alternate columns of the left eye subsampled image are placed column by column in the left eye portion of the 2D compatible image, and alternate columns of the right eye subsampled image are placed column by column in the right eye portion of the 2D compatible image.

12. The method in claim 7, further comprising an encoding the packed data at higher resolution processing at boundaries in the packed data to reduce undesirable noise in the compressed data.

13. A system to present 3D content to a viewer, comprising:

a set top box to receive a stereoscopic 3D image in a 2D compatible format having four quadrants, and having no data shifts resulting from subsampling of the stereoscopic 3D image;

a decompression system to decompress the 2D compatible format data taking into account that the 2D compatible format data had been compressed using a increased quantization resolution at at least one quadrant boundary of the 2D compatible format data and a presentation system to display the decompressed 3D content to a viewer.

14. The system recited in claim 13, wherein the set top box repacks the received stereoscopic 3D image into a format compatible with the presentation system.

15. The system recited in claim 13, wherein the subsampling is checkerboard subsampling.

16. A method for presenting 3D content to a viewer, comprising:

receiving a stereoscopic 3D image in a 2D compatible format, the 2D compatible format having four quadrants;

decompressing the received stereoscopic 3D image, wherein the decompressing takes into account that the 2D compatible data was compressed using increased quantization at at least one quadrant boundary; and presenting the decompressed stereoscopic 3D image to a viewer.

17. The method recited in claim 16, further comprising repacking the received the stereoscopic 3D image into a format compatible with the presentation system.

18. The method recited in claim 16, wherein the subsampling is checkerboard subsampling.

* * * * *